(12) United States Patent
Nishikawa et al.

(10) Patent No.: US 10,250,096 B2
(45) Date of Patent: Apr. 2, 2019

(54) ROTARY ELECTRIC MACHINE HAVING STATOR WITH NEUTRAL BUS-BAR DISPOSED BETWEEN PHASE BUS-BARS

(71) Applicant: MITSUBISHI ELECTRIC CORPORATION, Chiyoda-ku, Tokyo (JP)

(72) Inventors: Ken Nishikawa, Chiyoda-ku (JP); Masashi Nakamura, Chiyoda-ku (JP); Shogo Okamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 859 days.

(21) Appl. No.: 14/196,594

(22) Filed: Mar. 4, 2014

(65) Prior Publication Data

US 2015/0097453 A1 Apr. 9, 2015

(30) Foreign Application Priority Data

Oct. 7, 2013 (JP) .................................. 2013-209785

(51) Int. Cl.
 *H02K 3/00* (2006.01)
 *H02K 3/50* (2006.01)
 *H02K 3/52* (2006.01)

(52) U.S. Cl.
 CPC .............. *H02K 3/50* (2013.01); *H02K 3/505* (2013.01); *H02K 3/52* (2013.01); *H02K 3/521* (2013.01);
 (Continued)

(58) Field of Classification Search
 CPC ...... H02K 3/50; H02K 2203/09; H02K 3/505; H02K 3/52; H02K 3/521; H02K 3/522; H02K 3/524; H02K 3/525; H02K 3/46
 (Continued)

(56) References Cited

U.S. PATENT DOCUMENTS 2,871,285 A * 1/1959 Fouse ...................... H02G 5/06
 174/72 B
2,977,449 A * 3/1961 Roethlisberger ..... H01R 13/447
 200/293
(Continued)

FOREIGN PATENT DOCUMENTS

CN 1720653 A 1/2006
CN 103119834 A 5/2013
(Continued)

OTHER PUBLICATIONS

Communication dated Jul. 27, 2016 from the State Intellectual Property Office of the P.R.C. in counterpart Application No. 201410275837.7.

*Primary Examiner* — Thomas Truong
*Assistant Examiner* — Maged Almawri
(74) *Attorney, Agent, or Firm* — Sughrue Mion, PLLC; Richard C. Turner

(57) ABSTRACT

Obtain a rotary electric machine in which an insulation capability of bus-bar units is maintained in order to supply current to a coil of a stator of the rotary electric machine, and the whole stator can be downsized. In the arc-shaped bus-bar units which are laminated and arranged on a coil end of a stator of the rotary electric machine, a neutral-point bus-bar unit, which includes a neutral-point bus-bar is arranged at a midpoint of phase's bus-bar units, which include phase's bus bars.

17 Claims, 4 Drawing Sheets

(52) U.S. Cl.
CPC ............. *H02K 3/522* (2013.01); *H02K 3/524* (2013.01); *H02K 3/525* (2013.01); *H02K 2203/09* (2013.01)

(58) Field of Classification Search
USPC .......................................... 310/71, 180–208
See application file for complete search history.

(56) References Cited

U.S. PATENT DOCUMENTS

| | | | |
|---|---|---|---|
| 2002/0084713 A1* | 7/2002 | Kuroyanagi | H02K 3/50 310/180 |
| 2005/0023910 A1* | 2/2005 | Lukenich | H02K 3/522 310/71 |
| 2006/0091745 A1 | 5/2006 | Klappenbach et al. | |
| 2012/0086292 A1* | 4/2012 | Ishida | H02K 11/25 310/71 |
| 2012/0319512 A1* | 12/2012 | Nakagawa | H02K 1/278 310/71 |
| 2014/0014390 A1* | 1/2014 | Chamberlin | H02K 3/522 174/68.2 |
| 2014/0183993 A1* | 7/2014 | Takasaki | H02K 3/50 310/71 |
| 2014/0232215 A1* | 8/2014 | Takasaki | H02K 3/50 310/43 |

FOREIGN PATENT DOCUMENTS

| | | | | |
|---|---|---|---|---|
| JP | 2012-143019 A | 7/2012 | | |
| JP | WO 2013042248 A1 * | 3/2013 | ............... | H02K 3/50 |

* cited by examiner

ROTARY ELECTRIC MACHINE HAVING STATOR WITH NEUTRAL BUS-BAR DISPOSED BETWEEN PHASE BUS-BARS

BACKGROUND OF THE INVENTION

1. Field of the Invention

The present invention relates to a rotary electric machine that includes a bus-bar unit.

2. Description of the Background Art

In conventional stators, which include coil windings, of rotary electric machines, there have been many cases in which the stators are connected, by bus-bar units respectively provided at one side of each of stator cores, to coils arranged in each of slots, whereby electrical circuits are configured. In the cases, there has been a stator in which a bus bar is arranged on a coil end of the stator in accordance with a limitation of an area in which the stator in a housing can be arranged (for example, refer to Patent Document 1).

[Patent Document 1]

Japanese Laid-Open Patent Publication No. 2012-143091

In conventional rotary electric machines, when a bus bar for connecting a coil is arranged on a coil end, a configuration area of a bus-bar unit composing the bus bar is narrow, and it is difficult that a sufficient insulation distance between the bus bar and the coil is maintained. Moreover, when large current is passed through the bus bar, a sufficient cross-sectional area must be maintained in accordance with a consideration for a permissive current density, and the bus-bar unit has a tendency in that the bus-bar unit is extended in an axis direction of each of the rotary electric machines. As a result, there has been a problem in that a whole height of the stator is increased, whereby a size of each of the rotary electric machines is increased.

In the conventional art described in Patent Document 1, a bus-bar module is configured by separating four bus bars to two-step bus bars. However, the bus-bar module has a two-step configuration, so that there has been a problem in that the bus-bar module, in which all bus bars are integrated, must be reformed after two bus bars are formed. Moreover, in order to realize a constant structure, there has been a problem in that a forming resin must have a predefined thickness, and an excess insulation distance is required. As a result, there has been a problem in that the whole height of the stator is increased.

SUMMARY OF THE INVENTION

The present invention has been made to solve above-described problems, and an object of the invention is to obtain a rotary electric machine in which an insulation capability of a bus-bar unit composing a neutral-point bus bar can be improved, and a thickness of the neutral-point bus bar can be reduced, whereby the whole bus-bar unit can be downsized, and as a result, the whole height of the stator can be reduced.

A rotary electric machine according to the present invention includes a coil end which is protruded from an end surface of the stator so as to be formed, a coil terminal which is protruded, from an end portion of the coil end, in an coil end direction, and an arc-shaped bus-bar unit in which a connecting portion for connecting the coil terminal wraps a bus bar being protruded in an inner-outer diameter direction; wherein a neutral-point bus-bar unit, which includes a neutral-point bus bar, and phase's bus-bar units, which include phase's bus bars respectively connected to the coil of each phase, are laminated and arranged, in a protrusion direction of the coil terminal, in the bus-bar unit; and the neutral-point bus-bar unit is arranged between a plurality of the phase's bus-bar units.

According to the rotary electric machine of the present invention, an insulation distance between the phase's bus-bar units, in which a potential difference is large, can be maintained by arranging the neutral-point bus-bar unit between the phase's bus-bar units, and a bus-bar unit having a high insulation capability can be configured. Moreover, the whole height of the unit can be reduced by laminating and arranging a plurality of bus-bar units, whereby the stator can be more downsized.

DETAILED DESCRIPTION OF THE INVENTION

Embodiment 1

Figure 1:
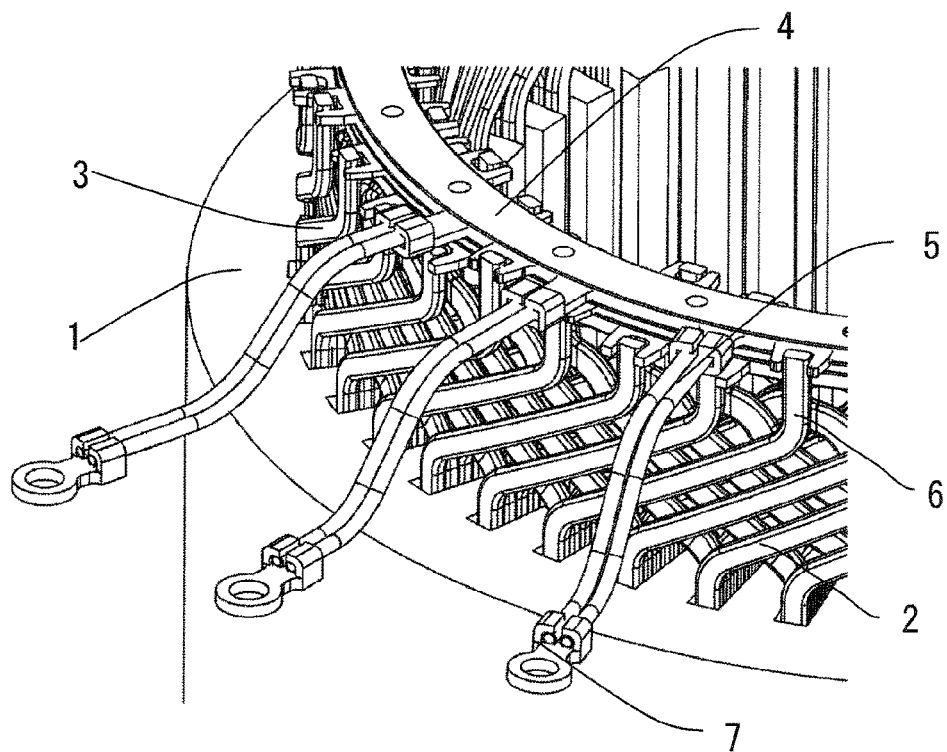
FIG. 1 is an oblique perspective view illustrating peripherals of components of a bus-bar unit of a stator in a rotary electric machine according to Embodiment 1 of the present invention.
Figure 2:
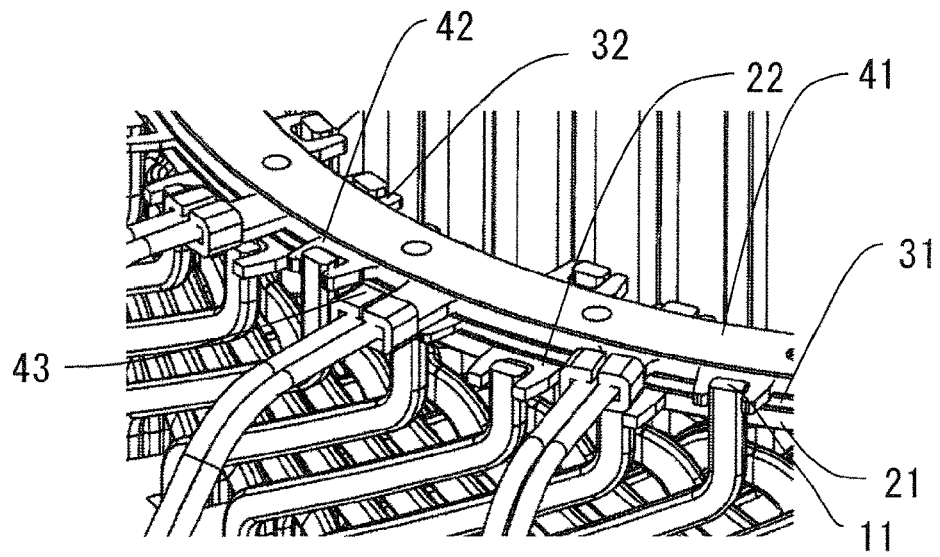
FIG. 2 is an oblique perspective view illustrating a detail of the components of the bus-bar unit of the stator in the rotary electric machine according to Embodiment 1 of the present invention.

FIG. 1 and FIG. 2 indicate main portions of a stator in a rotary electric machine according to Embodiment 1 of the present invention.

As indicated in FIG. 1 and FIG. 2, in the stator of the rotary electric machine of the present invention, a plurality of coils 2 are aligned and arranged in slots of a stator core 1 in the rotary electric machine. Terminals of the coils 2 are composed of coil ends 3 which are protruded toward an end surface of the stator core 1. A plurality of coil terminals 6 are provided in a state where the coil terminals 6 are protruded from an inner circumference end and an outer circumference end of the coil ends 3 to one-side of the coil ends. After the coils 2 are arranged in all slots of the stator core 1, the coil terminals 6 are partly protruded, at the end surface of the stator core 1, from the coil ends 3 to bus-bar units 4 which are described later. A plurality of the arc-shaped bus-bar units 4 are arranged on the coil ends 3, and the coil terminals 6 are connected to bus bars wrapped in the bus-bar units 4. Moreover, an attaching wire 5, to which a circular terminal 7 is attached, is connected to a tip of a feeding terminal 43 which is protruded from a phase's bus-bar unit 41, whereby an electrical connecting process for the rotary electric machine is terminated.

Phase's bus-bar units 21 and 41, which wrap phase's bus bars 22 and 42 for respectively connecting the coil for each phase, and a neutral-point bus-bar unit 31, which wraps a neutral-point bus bar 32 composing a neutral point, are arranged on the coil ends 3. A connecting terminal for connecting to the coil is protruded, from each of the bus-bar units, in an inner-outer diameter direction, and a connecting process for the coil is performed after each of the bus-bar units is arranged, whereby a configuration process for an electrical circuit of the stator is terminated. Moreover, on a terminal-wire connecting portion 11, the phase's bus-bar units 21 and 41, which wrap the phase's bus bars 22 and 42 for respectively connecting the coil for each phase, and the neutral-point bus-bar unit 31 composing the neutral point, are laminated and arranged in a protrusion direction of the coil terminal 6 in such a way that the neutral-point bus-bar unit 31 are arranged between the phase's bus-bar units 21 and 41.

Figure 3:
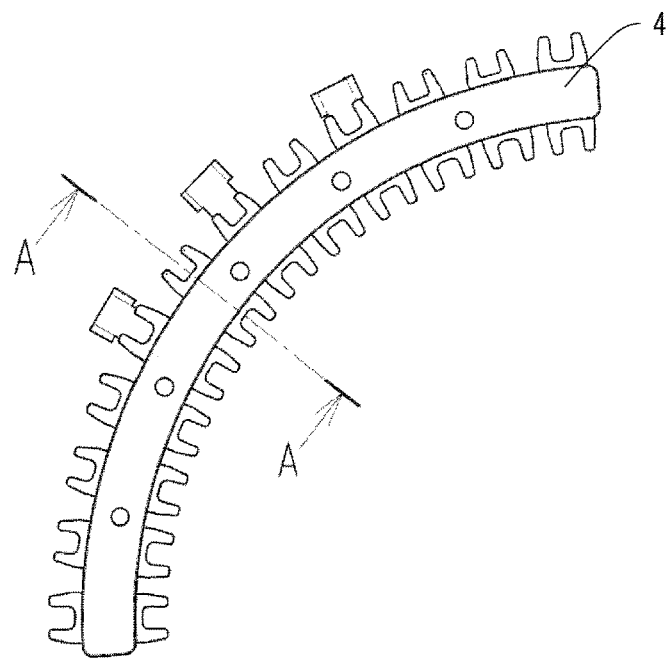
FIG. 3 is a plane view illustrating the bus-bar unit of the stator in the rotary electric machine according to Embodiment 1 of the present invention.
Figure 4:
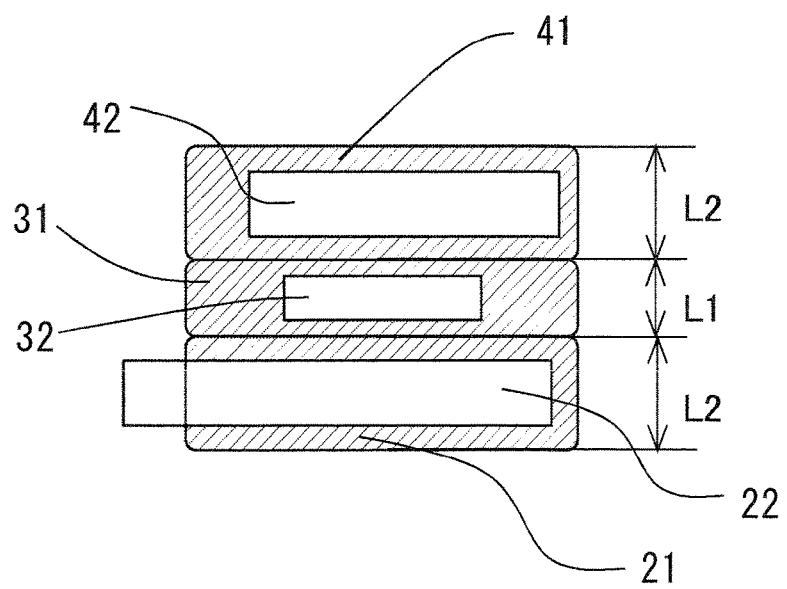
FIG. 4 is a cross-sectional view, along the line "A-A" in FIG. 3, illustrating the bus-bar unit of the stator in the rotary electric machine according to Embodiment 1 of the present invention.

FIG. 3 is a plane view illustrating the bus-bar units of the stator in the rotary electric machine in a case where the bus-bar units are laminated. A state of a cross section along the line "A-A" in FIG. 3 is indicated in FIG. 4. As illustrated in FIG. 4, a resin is molded around the bus bar having a thin plate shape on each of the bus-bar units 21, 31, and 41, whereby a resin layer is formed on each of the bus-bar units, and an insulation process is performed. On the other hand, the connecting portion for the terminal-wire connecting portion 11 is formed in such a way that the terminal-wire connecting portion 11 is protruded toward the outside, and the resin is not molded by a connecting process such as a welding process. As described above, the neutral-point bus-bar unit 31 is arranged between the two phase's bus-bar units 21, 41 in a state where each of the bus-bar units 21, 31, and 41 is laminated. Moreover, a thickness of the neutral-point bus bar 32, which is wrapped in the neutral-point bus-bar unit 31, is thinner than a thickness of each of the phase's bus bars 22 and 42, a thickness of a resin, which covers the neutral-point bus bar 32, is thinner than a thickness of a resin, which covers the phase's bus bars 22 and 42. When the rotary electric machine has the above-described configuration, a thickness size "L1", which is indicated in FIG. 4, of the neutral-point bus-bar unit 31 is thinner than a thickness size "L2" of each of the phase's bus-bar units 21 and 41. In other words, the thickness of the resin layers around the bus bars and the thickness of the bus bars can be reduced by using effects in which a potential difference and a current between the neutral-point bus bar and the phase's bus bars, and a height of the whole bus-bar units can be reduced.

As described above, a distance between the phase's bus bars, in which the potential difference is large, can be maintained by arranging the neutral-point bus bar 32 at a midpoint between the phase's bus bars 22 and 42, so that an insulation capability between the phase's bus bars can be improved. Moreover, a potential difference between the neutral-point bus bar 32 and the phase's bus bars is lower than a potential difference between the phase's bus bars, so that a required insulation distance between each of the bus bars can be reduced, and a thickness of the resin layers of the neutral-point bus-bar unit 31 can be thinned. Furthermore, an amount of an energized current of the neutral-point bus bar 32 is smaller than an amount of each of the phase's bus bars 22 and 42, so that the thickness of the bus bar can be reduced when an equivalent current density is estimated. A height of the whole bus-bar units can be reduced by the effect.

The phase's bus bars 22 and 42 in the two phase's bus-bar units 21 and 41, which sandwich the neutral-point bus-bar unit 31, are separated two types in which each of the phase's bus bars has the feeding terminal 43 or doesn't have the feeding terminal 43. In other words, a first phase's bus bar, which includes only a connecting portion for the coil terminal for each phase, and a second phase's bus bar, in which two connecting portions—a connecting portion for connecting the coil terminal for each phase and another portion for connecting the feeding terminal protruded in an outer circumference direction—are included in the phase's bus bars which are connected to the coils for each phase, and the second phase's bus bar is arranged at a most upper position in the protrusion direction of the coil terminal. As a result, the phase's bus-bar unit 41 including the feeding terminal 43 at the most upper position, which is higher than a position of the neutral-point bus-bar unit 31, in a protrusion direction of the coil terminals 6. Thereby, the sufficient insulation distance between the feeding terminal 43 of the phase's bus-bar unit 41 and the connecting portion of the other phase's bus-bar unit can be maintained, and the insulation capability of the feeding terminal 43 can be improved.

Figure 5:
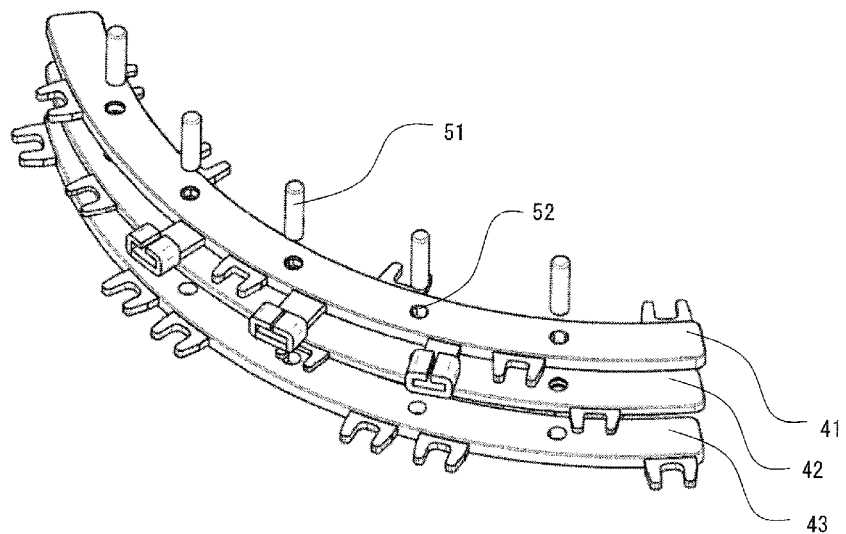
FIG. 5 is an oblique perspective view illustrating a state before supporting components, for positioning the bus-bar unit of the stator in the rotary electric machine according to Embodiment 1 of the present invention, are installed.
Figure 6:
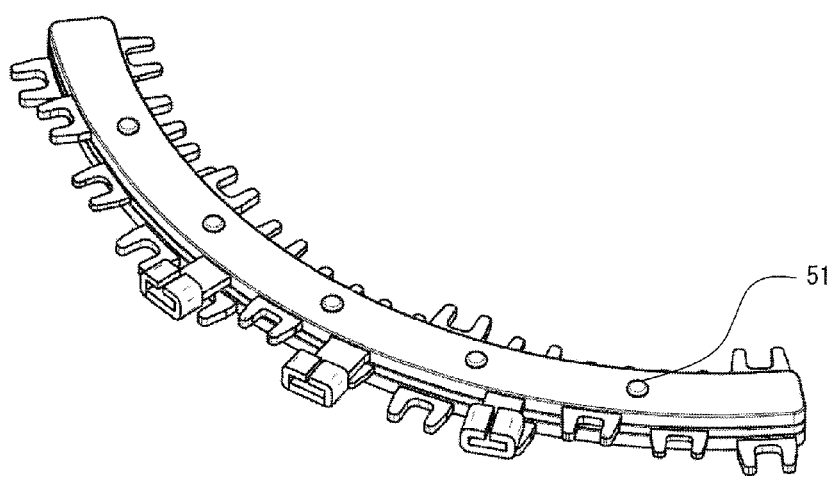
FIG. 6 is an oblique perspective view illustrating a state after the supporting components, for positioning the bus-bar unit of the stator in the rotary electric machine according to Embodiment 1 of the present invention, are installed.

Because each of the phase's bus-bar units 21, 31, and 41 is formed on the coil end of which shape is not constant, it is suitable that each of the units is integrated. Therefore, as illustrated in FIG. 5, a plurality of through holes 52, which are penetrated in a protrusion direction of the coil terminals 6, are formed, in accordance with the each of the phase's bus-bar units 21, 31, and 41, at the same position on a plane, which is parallel to the stator core 1 of the bus-bar units, and is arranged and integrated at the coil ends after the each of the phase's bus-bar units 21, 31, and 41 is positioned, as indicated in FIG. 6, by positioning pins, such as positioning-supporting components 51, each having a cylindrical shape, and then the each of the phase's bus-bar units 21, 31, and 41 is arranged at the coil ends. Thereby, positional accuracy of the connecting portion protruded from each of the bus bars can be improved, and connecting accuracy of the coil terminals 6 can be improved.

Embodiment 2

In the above-described rotary electric machine according to Embodiment 1, an insulating capability of the connecting portion for each of the bus bars 22, 32 and 42, which are stacked on the coil ends 3, are held by space insulation between the connecting portions for each of the bus-bar units and the coils. When a cooling method, such as an oil-in-cooling system, is used in this case, an iron powder or the like is deposited between the connecting portions, and the insulating capability between the connecting portions may be deteriorated.

Figure 7:
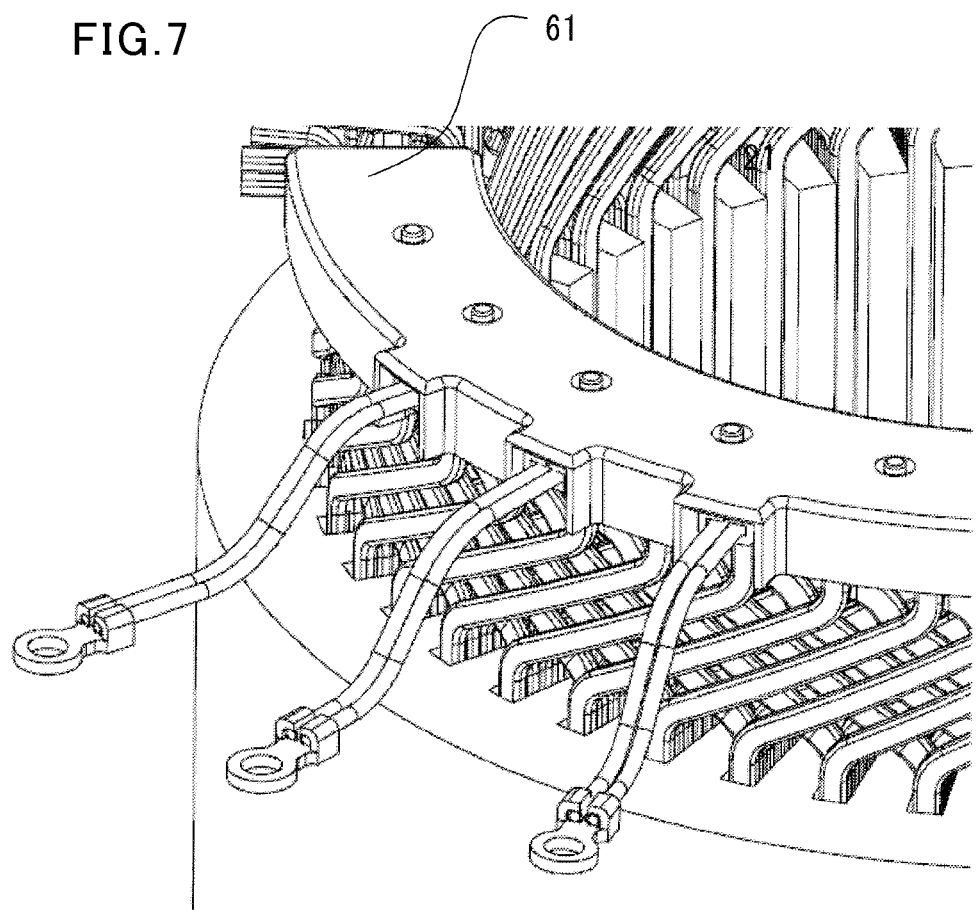
FIG. 7 is an oblique perspective view illustrating a state after a cover of a bus-bar unit of a stator in a rotary electric machine according to Embodiment 2 of the present invention is attached.
Figure 8:
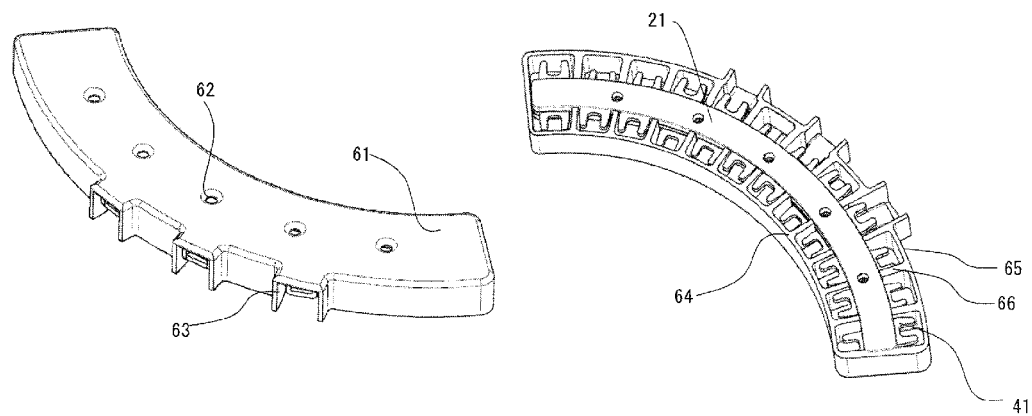
FIG. 8 is a disassembling oblique perspective view for explaining a structure of a cover of the bus-bar unit of the stator in the rotary electric machine according to Embodiment 2 of the present invention.

Therefore, in a rotary electric machine according to Embodiment 2 of the present invention, a resin cover 61, which covers a connecting portion for connecting each of bus bars and coil terminals 6, is positioned at a top step as illustrated in FIG. 7, and an inner-circumference rib 64, an outer-circumference rib 65, and a diameter-direction rib 66 are provided toward a terminal-wire connecting portion 11 as illustrated in FIG. 8, whereby a sufficient creepage distance for covering a surrounding area in a diameter direction and a circumference direction between the connecting portions is maintained, and a suitable insulating capability can be obtained. Moreover, the resin cover 61 may be used as a fixing component for each of the bus units, and positioning pins, which are used as the positioning-supporting components 51 illustrated in FIG. 5 and FIG. 6, may be inserted into fixing holes 62. Moreover, the resin cover 61 has a configuration, in which apertures 63 are formed at three positions, in order to protrude a feeding terminal 43 from the resin cover 61. In addition, the other configurations are same as the configurations in Embodiment 1, so that an explanation for the other configurations will be omitted.

In the above-described embodiments, when the neutral-point bus bar is configured between the phase's bus bars, a number of the phase's bus bars is not limited to two, and if necessary in the configuration, the phase's bus bars, of which number is greater than or equal to 3, can be arranged.

Moreover, in the above-described embodiments, an example is explained in which the positioning pins are attached to the coil ends after the bus-bar units are integrated by the positioning pins used as the positioning-supporting components 51. However, an attaching sequence is not limited to this example, the positioning pins used as the positioning-supporting components 51 may be inserted and integrated after each of the bus-bar units are attached.

In the present invention, it is possible in the scope of the present invention that each of the embodiments is freely combined, or each of embodiments is suitably modified or omitted.

What is claimed is:

1. A rotary electric machine comprising:
a stator, in which a coil is mounted on a stator core having an annular shape, which includes a coil end which is protruded from an end surface of the stator;
a coil terminal which is protruded; from an end portion of the coil end, in a coil end direction; and
an arc-shaped bus-bar unit which wraps a bus bar and in which a connecting portion configured to connect the coil terminal protrudes in an inner-outer diameter direction of the stator,
wherein a neutral-point bus-bar unit, which includes a neutral-point bus bar, and phase's bus-bar units, which include phase's bus bars respectively connected to the coil of each phase, are laminated and arranged in a protrusion direction of the coil terminal, in the bus-bar unit, and
the neutral-point bus-bar unit is arranged between the phase's bus-bar units.

2. A rotary electric machine as recited in claim 1, wherein a connecting portion for connecting the coil terminal for the neutral-point bus bar and the phase's bus bar is covered by a resin cover which is positioned at a top step in the protrusion direction of the coil terminal.

3. A rotary electric machine as recited in claim 1, wherein the phase's bus bars are arranged at a top and at a bottom of the neutral-point bus-bar unit.

4. A rotary electric machine as recited in claim 1, wherein each bus-bar unit includes a plurality of holes, which are penetrated in an axis direction toward the same position on a plane being parallel to the end surface of the stator core, and is integrated by supporting components which respectively penetrate the holes.

5. A rotary electric machine as recited in claim 4, wherein a connecting portion for connecting the coil terminal for the neutral-point bus bar and the phase's bus bar is covered by a resin cover which is positioned at a top step in the protrusion direction of the coil terminal.

6. A rotary electric machine as recited in claim 1, wherein a resin layer is formed, in the bus-bar unit, around the bus bar which is wrapped by the each bus-bar unit, and a thickness of the neutral-point bus-bar unit is thinner than a thickness of each of the phase's bus-bar units, and a thickness of neutral-point bus bar is thinner than a thickness of each of the phase's bus bars.

7. A rotary electric machine as recited in claim 6, wherein a connecting portion for connecting the coil terminal for the neutral-point bus bar and the phase's bus bar is covered by a resin cover which is positioned at a top step in the protrusion direction of the coil terminal.

8. A rotary electric machine as recited in claim 6, wherein each bus-bar unit includes a plurality of holes, which are penetrated in an axis direction toward the same position on a plane being parallel to the end surface of the stator core, and is integrated by supporting components which respectively penetrate the holes.

9. A rotary electric machine as recited in claim 8, wherein a connecting portion for connecting the coil terminal for the neutral-point bus bar and the phase's bus bar is covered by a resin cover which is positioned at a top step in a in the protrusion direction of the coil terminal.

10. A rotary electric machine as recited in claim 1, wherein the phase's bus bar connected to the coil of each phase includes a first phase's bus bar including a connecting portion for the coil terminal of each phase, and a second phase's bus bar including a connecting portion for the coil terminal of each phase and a connecting portion for a feeding terminal that is protruded in an outer direction of the inner-outer diameter direction, and
the second phase's bus is arranged at a most upper position in the protrusion direction of the coil terminal.

11. A rotary electric machine as recited in claim 10, wherein a connecting portion for connecting the coil terminal for the neutral-point bus bar and the phase's bus bar is covered by a resin cover which is positioned at a top step in the protrusion direction of the coil terminal.

12. A rotary electric machine as recited in claim 10, wherein each bus-bar unit includes a plurality of holes, which are penetrated in an axis direction toward the same position on a plane being parallel to the end surface of the stator core, and is integrated by supporting components which respectively penetrate the holes.

13. A rotary electric machine as recited in claim 12, wherein a connecting portion for connecting the coil terminal for the neutral-point bus bar and the phase's bus bar is covered by a resin cover which is positioned at a top step in the protrusion direction of the coil terminal.

14. A rotary electric machine as recited in claim 10, wherein a resin layer is formed, in the bus-bar unit, around the bus bar which is wrapped by the each bus-bar unit, and a thickness of the neutral-point bus-bar unit is thinner than a thickness of each of the phase's bus-bar units, and a thickness of neutral-point bus bar is thinner than a thickness of each of the phase's bus bars.

15. A rotary electric machine as recited in claim 14, wherein a connecting portion for connecting the coil terminal for the neutral-point bus bar and the phase's bus bar is covered by a resin cover which is positioned at a top step in the protrusion direction of the coil terminal.

16. A rotary electric machine as recited in claim 14, wherein each bus-bar unit includes a plurality of holes, which are penetrated in an axis direction toward the same position on a plane being parallel to the end surface of the stator core, and is integrated by supporting components which respectively penetrate the holes.

17. A rotary electric machine as recited in claim 16, wherein a connecting portion for connecting the coil terminal for the neutral-point bus bar and the phase's bus bar is covered by a resin cover which is positioned at a top step in the protrusion direction of the coil terminal.

* * * * *